Aug. 16, 1949.    F. S. SCHRAGE    2,479,085
RAILWAY CAR BRAKE

Filed June 8, 1945    3 Sheets-Sheet 1

INVENTOR.
Frederick S. Schrage
BY
Evans + McCoy
ATTORNEYS

Aug. 16, 1949.   F. S. SCHRAGE   2,479,085
RAILWAY CAR BRAKE
Filed June 8, 1945   3 Sheets-Sheet 2
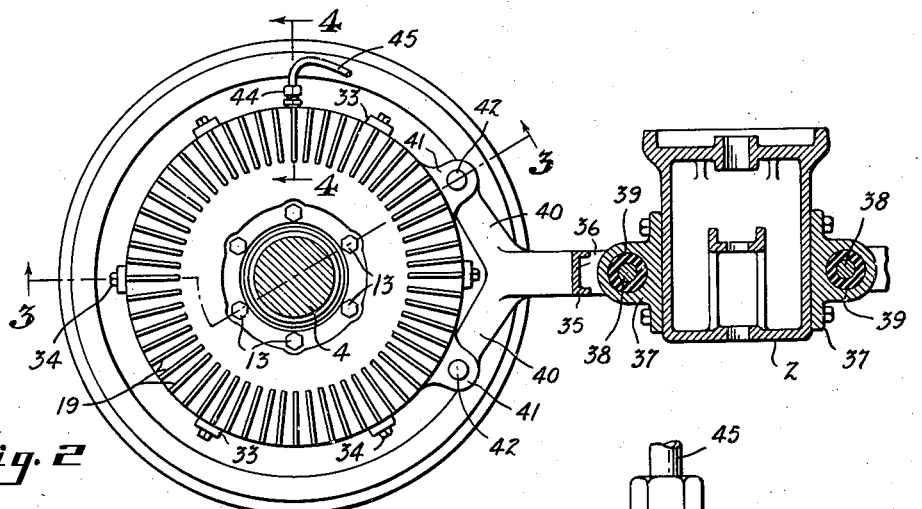
Fig. 2
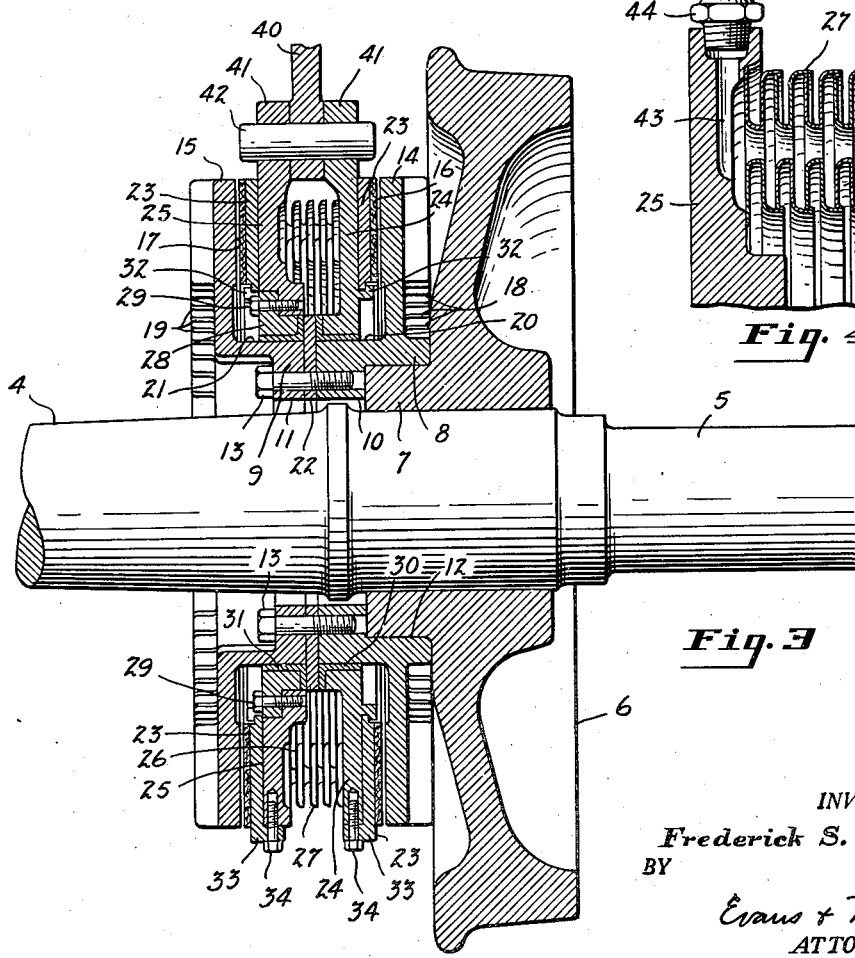
Fig. 4
Fig. 3
INVENTOR.
Frederick S. Schrage
BY
Evans & McCoy
ATTORNEYS Aug. 16, 1949.  F. S. SCHRAGE  2,479,085
RAILWAY CAR BRAKE
Filed June 8, 1945  3 Sheets-Sheet 3
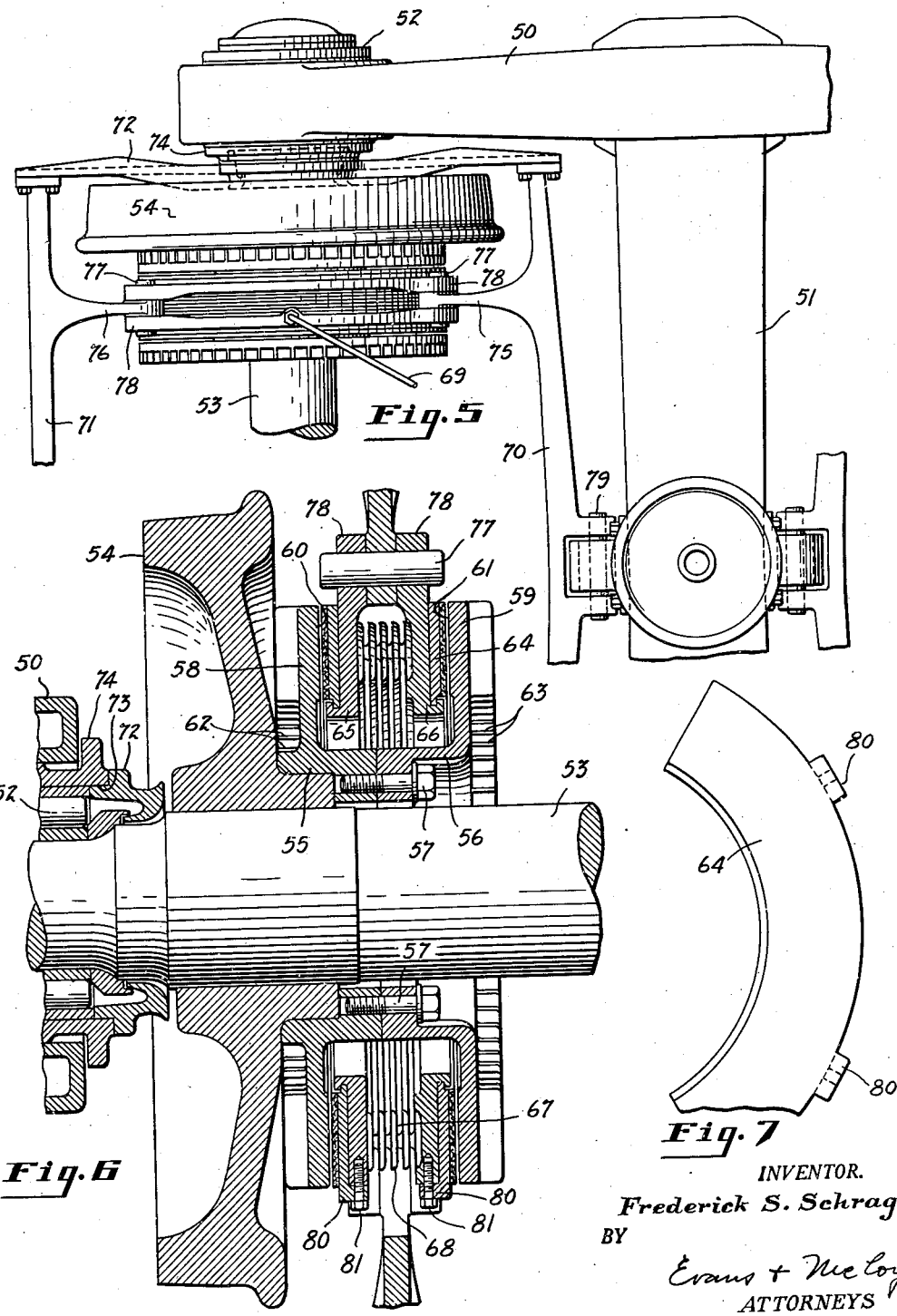
INVENTOR.
Frederick S. Schrage
BY
Evans + McCoy
ATTORNEYS Patented Aug. 16, 1949

2,479,085

UNITED STATES PATENT OFFICE 2,479,085

RAILWAY CAR BRAKE

Frederick S. Schrage, Rock Island, Ill., assignor to The Bettendorf Company, Bettendorf, Iowa, a corporation of Maryland Application June 8, 1945, Serial No. 598,249

9 Claims. (Cl. 188—59)

This invention relates to brake mechanisms for railway cars and particularly to a brake mechanism of the drum type applied to railway car trucks of conventional construction.

The invention has for an object to provide a brake for railway car wheels in which the brake members have a large area of frictional contact and are so constructed and arranged that heat generating therein during braking is rapidly dissipated.

Another object of the invention is to provide a brake of rugged construction utilizing brake members attached to the wheel and independent of the wheel tread.

An additional object of the invention is to provide a brake having annular brake shoes that engage annular friction members carried by the wheels and in which the brake shoes are so mounted in the truck coaxially with the wheels that they may be moved axially into and out of engagement with brake members attached to the wheels.

A further object of the invention is to provide a car wheel brake employing a channel shaped brake drum provided with axially spaced friction faces that are engaged by annular brake shoes mounted in the channel for axial movements into and out of engagement with the friction faces.

Another object of the invention is to provide a support for the annular brake shoes associated with each axle that has a cushioned vibration damping connection to the truck frame.

Another object of the invention is to provide brake shoe supports including a brake beam that is yieldably connected with the bolster of the truck.

With the above and other objects in view, the invention may be said to comprise the railway brake mechanism as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Fig. 2 is a section taken on the line indicated at 2—2 in Fig. 1;

Fig. 3 is a section through the wheel and brake taken on the line indicated at 3—3 in Fig. 2;

Fig. 4 is a fragmentary section on an enlarged scale taken on the line indicated at 4—4 in Fig. 2;

Fig. 5 is a fragmentary plan view showing a modified construction;

Fig. 6 is a section similar to that shown in Fig. 3 through the wheel and brake shown in Fig. 5.

Fig. 7 is a fragmentary side elevation of a brake shoe.

Figure 1:
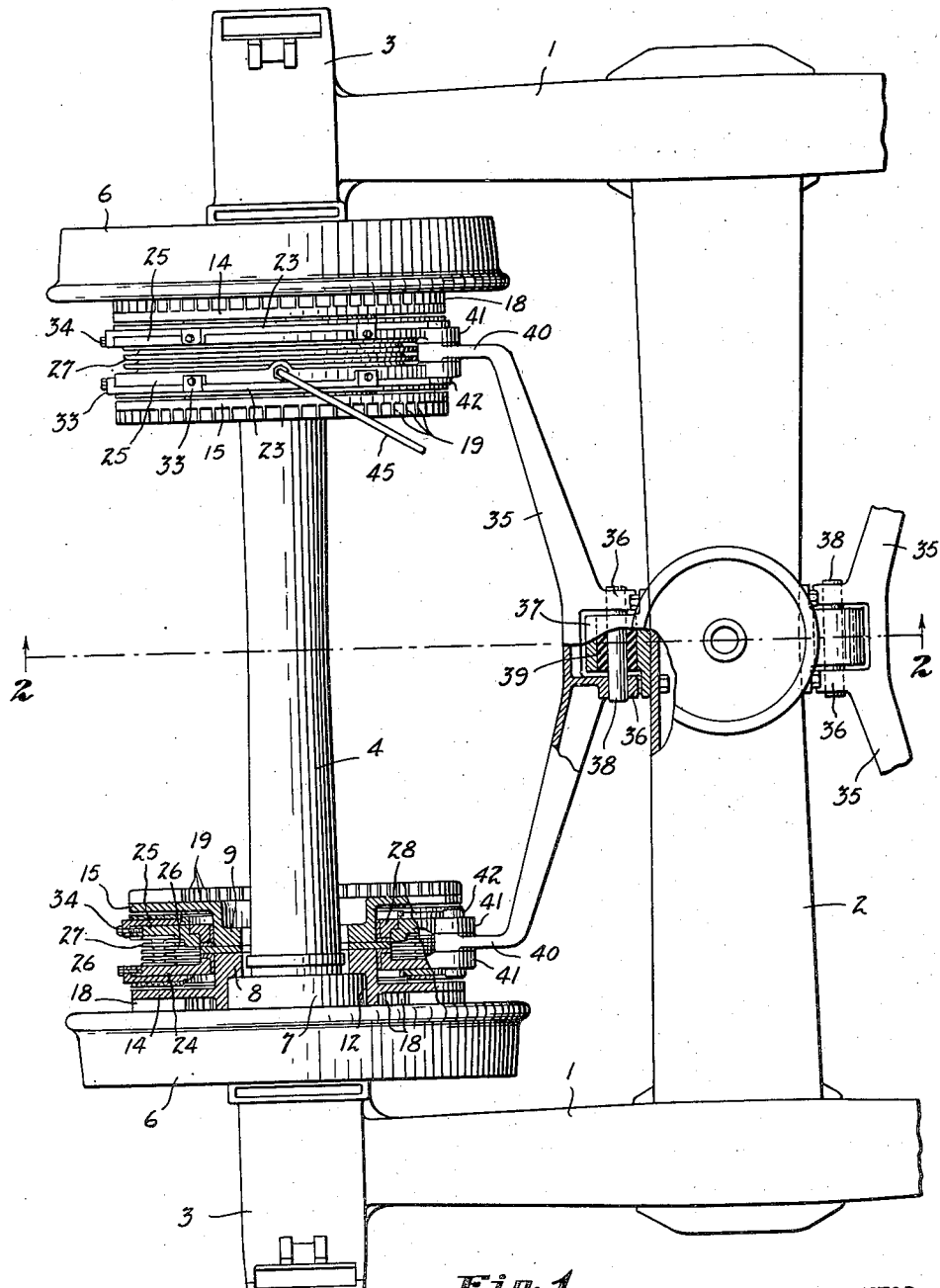
Figure 1 is a fragmentary top plan view showing one end of a railway car truck equipped with the brake mechanism of the present invention.

In Figs. 1 to 4 of the drawings the brake mechanism of the present invention is shown applied to a railway car truck of the type commonly employed on freight cars. The truck frame comprises side frames 1 and a bolster 2 yieldably mounted for vertical movement in the side frames and providing a cross connection between the side frames. The side frames 1 have journal boxes 3 at the ends thereof in which the ends of a cross axle 4 are journaled. The axle 4 has a bearing portion 5 at each end that is received in a journal box and a wheel 6 is attached to the axle inwardly of each bearing portion 5. The wheel 6 rotates with the axle and may be attached thereto by shrinking on the axle.

The wheel 6 has an inwardly projecting hub 7 which serves to support a brake drum that is composed of outer and inner sections 8 and 9. The sections 8 and 9 have central openings 10 and 11 to receive the axle 4 and the outer section 8 has a counterbore 12 to receive the hub 7. The member 8 may be attached to the wheel by shrinking it upon the hub 7. The sections 8 and 9 of the brake drum are attached together by means of bolts 13 and these members are provided with spaced peripheral flanges 14 and 15 that provide an outwardly facing channel between them, the flanges 14 and 15 having inner friction faces 16 and 17 for engagement with brake shoes mounted between the flanges. The outer sides of the flanges 14 and 15 are provided with fins 18 and 19 that serve to radiate and rapidly dissipate heat generated during braking. The flanges 14 and 15 of the sections 8 and 9 are offset laterally with respect to the inner portions of the sections which are connected by bolts 13. Inwardly of the flanges 14 and 15 the members 8 and 9 have cylindrical faces 20 and 21 that form the bottom of the drum channel.

An annular spacing plate 22 is attached between the sections 8 and 9 and projects into the channel formed by the sections to provide a central circumferential positioning rib. A pair of annular brake shoes 23 are mounted in the brake drum channel and these brake shoes are carried by the heads 24 and 25 of an annular bellows that is positioned in the brake drum channel. The heads 24 and 25 are connected by concentric, circumferentially plaited bellows walls 26 and 27. The bellows walls 26 and 27 are formed of resilient sheet metal and serve as springs to normally hold the heads 24 and 25 in brake shoe releasing position. When fluid pressure within the bellows acts upon the heads 24 and 25 the heads move apart extending the walls 26 and 27 and pressing the brake shoes against the friction faces 16 and 17. When the fluid pressure is released the resilint bellows walls 26 and 27 are contracted axially to release the brake shoes.

To facilitate assembly of the brake drum and bellows, the inner head 25 may have a detachable inner section 28 that is secured to the body of the head by means of bolts 29. The heads 24 and 25 have a sliding fit on the cylindrical surfaces 20 and 21 on opposite sides of the positioning plate 22, the heads being provided with bearing bushings 30 and 31 for engagement with the cylindrical surfaces.

The outer faces of the heads 24 and 25 have grooved flanges 32 to receive the rabbeted inner edges of the brake shoes 23, the brake shoes being in the form of flat annular plates with spaced laterally projecting lugs 33 at the outer periphery thereof, which are adapted to engage the peripheries of the heads 24 and 25, the shoes being attached to the heads by means of bolts 34 extending through the lugs 33.

The brake shoe carrying bellows is supported in part by the brake drum and in part by a brake beam 35 carried by the truck frame. The beam 35 has projecting lugs 36 substantially midway between its ends that straddle a pivot bracket 37 attached to the bolster 2. A pivot pin 38 extends through the lugs 36 and the bracket 37, and is yieldably supported in the bracket by means of a rubber bushing 39 that surrounds the pin and that is confined under radial compression between the pin and the pin receiving sleeve of the bracket 37.

At each end the brake beam 35 has a yoke formed by diverging arms 40 that have their outer ends between pairs of lugs 41 projecting from the peripheries of the heads 24 and 25. Two pairs of lugs are provided, one pair being positioned above and the other below the wheel axle. The arms 40 carry pins 42 that are disposed parallel to the axle and extend through holes in the lugs 41.

The brake beam 35 provides a connection between the annular bellows and the truck frame which restrains rotative movements of the bellows and brake shoes. By reason of the pivotal and yielding connections between the brake beam and bolster, the bellows and brake shows can have slight angular movements to accommodate the vertical movements of the bolster and brake beam, pins 42 permitting the heads 24 and 25 to which the brake shoes are attached to have free axial movements into and out of braking positions.

As shown in Fig. 4, the head 25 has a passage 43 leading to the space between the flexible bellows walls 26 and 27, a fitting 44 being provided at the outer end of the passage 43 to which a pipe 45 is connected for delivering fluid under pressure to the bellows. The pipe 45 may be connected to any suitable source of fluid under pressure such as the train air line. When fluid pressure is admitted to the bellows through the pipe 45, the bellows are extended and the brakes are applied. When the fluid pressure is released the resilience of the concentric walls 26 and 27 contracts the bellows and disengages the brake shoes.

In Figs. 5 to 7 of the drawings the invention is shown applied to a car truck of the type in which roller bearings are provided for the car axles. In this form of truck side frames 50 are provided which are connected by a bolster 51, the side frames 50 being provided with roller bearings 52 at the ends thereof in which the ends of a cross axle 53 are journaled. The axle 53 carries a wheel 54 and the wheel has a brake drum similar to the drum shown in Figs. 1 to 4 that is composed of sections 55 and 56 connected by bolts 57. The sections 55 and 56 when secured together provide a rigid channel shaped brake drum with spaced peripheral flanges 58 and 59 having inner friction faces 60 and 61, and outer faces provided with heat radiating fins 62 and 63. Brake shoes 64 are provided for engagement with the friction faces 60 and 61 and these shoes are carried by heads 65 and 66 of an annular bellows which consists of the heads 65 and 66 and concentric circumferentially plaited bellows walls 67 and 68. An air pipe 69 is provided for inflating the bellows and the bellows operates to apply the brakes in the same manner as in the modification first described.

The device shown in Figs. 5 to 7 differs from the modification first described mainly in the means for supporting the annular bellows. In this modification a brake beam is provided which has inner and outer bars 70 and 71 that are positioned on opposite sides of the axle. The inner and outer bars 70 and 71 are rigidly connected to end bars 72 which have central bearing portions 73 that are pivoted on a bearing member 74 carried by the side frame 50 and concentric with the axle. The brake beam supported on the bearing member 74 provides a brake shoe support that swings about the axis of the wheel and axle. For supporting the brake shoes, the bars 70 and 71 have superposed diverging arms 75 and 76 projecting toward opposite sides of the brake drum, each arm having a pin 77 adjacent its end that is disposed parallel to the axle. The arms 75 and 76 are positioned between lugs 78 on the heads 65 and 66 of the bellows with the pins 77 extending through apertures in the lugs 78 and serve to support the bellows centrally of the brake drum channel and coaxially with the drum and to permit the heads 65 and 66 to be moved axially to engage or disengage the brake shoes.

Substantially midway between its ends the bar 70 of the brake beam has a yielding pivotal connection 79 to the bolster 51 which may be the same as the connection between the brake beam 35 and the bolster 2 in the modification first described. The brake shoes 64 are attached to the heads 65 and 66 in substantially the same way as in the modification first described, the brake shoes having lugs 80 that overlie the peripheries of the heads 65 and 66 and being attached to the heads by means of bolts 81.

It is to be understood that variations and modifications of the specific devices herein shown and described for purposes of illustration, may be made without departing from the spirit of the invention.

What I claim is:

1. In a railway truck having side frames, a bolster connecting said frames, a cross axle journaled in the frames and wheels on said axle, an annular brake member carried by each wheel and having a laterally facing friction face, an annular brake shoe slidably and rotatably mounted on each of said brake members, a brake beam extending transversely of said side frames, pivoted intermediate its ends to said bolster and connected to said brake shoes, and means for shifting said brake shoes axially into and out of engagement with said friction faces.

2. In a railway truck having side frames, a bolster connecting the side frames, a cross axle journaled in the side frames and wheels on said axle, brake drums rotatable with the wheels, each brake drum having a peripheral outwardly facing channel the side walls of which provide axially spaced friction faces, an annular brake unit mounted in the channel of each of said brake drums, each unit comprising a pair of axially movable brake shoes, each shoe being slidably and rotatably mounted upon the bottom of the brake drum channel, means for supporting said units and for holding the same against rotation including a member attached to the bolster and to each of said units, and means simultaneously moving the shoes of each unit into and out of engagement with said friction faces.

3. In a railway truck having side frames, a bolster connecting the side frames, a cross axle journaled in the side frames and wheels on said axle, brake drums rotatable with the wheels, each brake drum having a peripheral outwardly facing channel the side walls of which provide axially spaced friction faces, an annular brake unit mounted in the channel of each of said brake drums, each unit comprising a pair of axially movable brake shoes, means for supporting said units and for holding the same against rotation including a member pivotally connected to the bolster and having yokes at the ends thereof, each provided with vertically spaced arms having transverse pins upon which said shoes are slidably supported, and means for moving the shoes into and out of engagement with said friction surfaces.

4. In a railway truck having side frames, a bolster connecting the side frames, a cross axle journaled in the side frames and wheels on said axle, brake drums rotatable with the wheels, each brake drum having a peripheral outwardly facing channel the side walls of which provide axially spaced friction faces, an annular brake unit mounted in the channel of each of said brake drums, each unit comprising a pair of axially movable brake shoes, means for supporting said units coaxially with the wheels comprising a member pivotally connected to the side frames to swing about the axis of the axle, means yieldably connecting said member to the frame to limit its pivotal movement, and means for simultaneously moving the shoes of each unit on said supporting member into and out of engagement with said friction faces.

5. In a railway truck having side frames, a bolster connecting said frames, a cross axle journaled in said frames and wheels carried by said axle, brake drums attached to the inner sides of said wheels, each brake drum having an inwardly facing friction face and a cylindrical inwardly projecting portion inwardly of said friction face, an annular member slidably and rotatably fitting on the cylindrical portion of each brake drum, a brake shoe carried by each slidable member and engageable with the adjacent friction face, a brake beam connected by a horizontal pivot to the bolster, said beam having forked ends with upwardly and downwardly extending arms, means connecting each of said shoe carrying members to the vertically spaced arms at one end of the brake beam, and means for shifting said shoe carrying members axially to engage said shoes with said friction faces.

6. In a railway truck having side frames, a bolster connecting said side frames, a cross axle journaled in said side frames and wheels carried by said axle, brake members attached to said wheels and having laterally facing friction faces, a brake beam extending across the space between the side frames, pivoted to the side frames to turn about the axle axis and having a yielding connection to said bolster, annular brake shoes supported by the brake beam coaxially with said wheels for axial movements into and out of engagement with said friction faces, and means for shifting said shoes into and out of engagement with said friction faces.

7. In a railway truck having side frames, a bolster connecting said side frames, a cross axle journaled in said side frames and wheels carried by said axle, annular brake members attached to the wheels, annular brake shoes mounted for axial movement into and out of engagement with said brake members, a brake beam yieldably attached to the bolster and having arms at each end thereof provided with vertically spaced pins disposed parallel to the axle, brake shoes slidably mounted on said pins, and means for moving said brake shoes axially into and out of engagement with said brake members.

8. In a railway truck having side frames, a bolster connecting said side frames, an axle journaled in the side frames and wheels on the axle, brake drums attached to the wheels and having friction faces perpendicular to the drum axis, a brake beam pivoted to the side frames to swing about the axis of the axle, brake shoes mounted for sliding movement on said beam and engageable with said drum, means for limiting the swinging movements of said beam about the axle, and actuators for said shoes.

9. In a railway truck having side frames, a bolster connecting said side frames, an axle journaled in the side frames and wheels on the axle, brake drums attached to the wheels, a brake beam extending across the space between the side frames and pivoted to the side frames to swing about the axis of the axle, brake shoes slidably mounted on said beam and engageable with said drum, and means yieldably connecting said brake beam to the bolster to limit swinging movements of the beam.

FREDERICK S. SCHRAGE.

REFERENCES CITED

The following references are of record in the file of this patent:

UNITED STATES PATENTS

| Number | Name | Date |
|---|---|---|
| 1,079,357 | Napier | Nov. 25, 1913 |
| 1,909,744 | Berg | May 16, 1933 |
| 2,174,397 | Farmer | Sept. 26, 1939 |
| 2,174,400 | McCune | Sept. 26, 1939 |
| 2,174,409 | McCune | Sept. 26, 1939 |
| 2,204,807 | McCune | June 18, 1940 |
| 2,236,898 | Eksergian | Apr. 1, 1941 |
| 2,267,560 | Farmer | Dec. 23, 1941 |